(12) United States Patent
Kosoburd et al.

(10) Patent No.: US 11,564,358 B2
(45) Date of Patent: Jan. 31, 2023

(54) LIGHTING MODULE FOR INDOOR FARMING

(71) Applicants: Tatiana Kosoburd, Lod (IL); Joseph Kedmi, Lod (IL)

(72) Inventors: Tatiana Kosoburd, Lod (IL); Joseph Kedmi, Lod (IL)

( * ) Notice: Subject to any disclaimer, the term of this patent is extended or adjusted under 35 U.S.C. 154(b) by 0 days.

(21) Appl. No.: 17/298,763

(22) PCT Filed: Dec. 29, 2019

(86) PCT No.: PCT/IL2019/051426
§ 371 (c)(1),
(2) Date: Jun. 1, 2021

(87) PCT Pub. No.: WO2020/152667
PCT Pub. Date: Jul. 30, 2020

(65) Prior Publication Data
US 2022/0053705 A1    Feb. 24, 2022

Related U.S. Application Data

(60) Provisional application No. 62/795,266, filed on Jan. 22, 2019.

(51) Int. Cl.
*F21V 9/30*        (2018.01)
*A01G 7/04*        (2006.01)
(Continued)

(52) U.S. Cl.
CPC .............. *A01G 7/045* (2013.01); *F21V 3/062* (2018.02); *F21V 7/24* (2018.02); *F21V 9/30* (2018.02);
(Continued)

(58) Field of Classification Search
CPC ............ A01G 7/045; A01G 9/249; F21V 9/30
See application file for complete search history.

(56) References Cited

U.S. PATENT DOCUMENTS 5,278,432 A    1/1994  Ignatius et al.
8,579,466 B2  11/2013  Meir et al.
(Continued)

FOREIGN PATENT DOCUMENTS

CN    102081184 B  *  3/2013
WO    2014098735 A1    6/2014
WO    2015013594 A1    1/2015

OTHER PUBLICATIONS

PCT International Search Report for International Application No. PCT/IL2019/051426, dated Apr. 16, 2020, 6pp.
(Continued)

*Primary Examiner* — William J Carter
(74) *Attorney, Agent, or Firm* — The Roy Gross Law Firm, LLC; Roy Gross

(57) ABSTRACT

A lighting module for illuminating cultivated crops in indoor farming comprises at least one monolithic efficiency enhancing optical element (EEOE) further comprising: (a) a front portion comprising a spectrum conversion layer; (b) an optically transparent middle body portion having at least one light source embedded there within and configured to emit spectrally controllable radiation; and (c) a back portion configured to reflect the radiation emitted by the spectrum conversion layer to the cultivated crops. The back portion has a central area being adjacent to the optically transparent middle body portion configured for reflecting radiation propagating within the optically transparent middle body portion and a peripheral area configured for reflecting radiation emerged from the optically transparent middle body portion via the side surface.

18 Claims, 25 Drawing Sheets

(51) Int. Cl.
    *F21V 7/24*     (2018.01)
    *F21V 3/06*     (2018.01)
    *F21V 17/00*     (2006.01)
    *F21V 23/00*     (2015.01)
    *F21Y 115/10*     (2016.01)

(52) U.S. Cl.
    CPC .......... *F21V 17/002* (2013.01); *F21V 23/003* (2013.01); *F21Y 2115/10* (2016.08)

(56) References Cited

U.S. PATENT DOCUMENTS

| | | |
|---|---|---|
| 9,137,874 B2 | 9/2015 | Maxik et al. |
| 9,857,519 B2 | 1/2018 | Shani et al. |
| 9,883,635 B2 | 2/2018 | Aikala et al. |
| 10,151,446 B2 | 12/2018 | Speier et al. |
| 10,261,493 B2 | 4/2019 | Hillberg et al. |
| 10,674,677 B2 | 6/2020 | Pohjanvouri et al. |
| 10,750,586 B2 | 8/2020 | Aikala |
| 11,262,063 B2 * | 3/2022 | Wolfe .................. G02B 6/0085 |
| 2012/0170303 A1 | 7/2012 | Meir |
| 2013/0100700 A1 * | 4/2013 | Kubo ................. A01G 13/0231 362/611 |
| 2013/0326941 A1 * | 12/2013 | Pickett .................. C12M 31/10 977/774 |
| 2015/0075069 A1 | 3/2015 | Ichihashi et al. |
| 2015/0109773 A1 | 4/2015 | Li et al. |
| 2017/0356603 A1 | 12/2017 | Narendran et al. |
| 2019/0124854 A1 * | 5/2019 | York ........................ A01G 9/26 |

OTHER PUBLICATIONS

PCT Written Opinion for International Application No. PCT/IL2019/051426, dated Apr. 16, 2020, 5pp.
PCT International Preliminary Report on Patentability for International Application No. PCT/IL2019/051426, dated Jul. 27, 2021, 6pp.

\* cited by examiner

LIGHTING MODULE FOR INDOOR FARMING

CROSS REFERENCE TO RELATED APPLICATIONS

This is a National Phase Patent Application which claims priority and the benefit to PCI Patent Application PCT/IL2019/051426 filed Dec. 29, 2019 and claims benefit to U.S. Provisional Patent Application No. 62/795,266 filed Jan. 22, 2019, which is incorporated by reference herein in its entirety.

FIELD OF THE INVENTION

The present invention relates to high efficiency LED lighting devices and, more particularly, to high photosynthetic-photon-efficacy lighting for indoor farming.

BACKGROUND OF THE INVENTION

Artificial light sources are used as grow lights to replace sun light in indoor farming. This mainly includes plants but also livestock and insects farming. The most common types of grow lights are High Intensity Discharge (HID) lamps, Fluorescent lamps, and Light Emitting Diode (LED) lamps. One of the main costs of operating a grow light is its energy consumption. Unfortunately, many grow lights are not very efficient and using them leads to high operation costs. When speaking about efficiency of grow lights, the important parameter is the photosynthetic photon efficacy (PPE) which is the ratio between the light source photon output utilized in photosynthesis to its electrical energy consumption (the PPE units are micromole per joule). In recent years LED-based grow lights are becoming more and more popular due to their high efficacy and long lifetime. Although LED-based lamps are significantly more efficient than HID lamps, energy consumption is still the main cost of operating a grow light; therefore, it is important to make them as efficient as possible. So, every increase in the efficacy of LED grow lights is desirable and will benefit the users of grow lights, allowing them to reduce the costs of operating their indoor gardening venture. A grow light with high efficacy reduces operating costs firstly by reducing direct consumption of electrical energy, and secondly by producing much less heat to a level that makes active cooling systems such as fans and air conditioners unnecessary.

There are various factors that limit the efficacy of current LED lights. One of them is that some of the light emerging from the LED die is reflected by the various surfaces of the LED and by surfaces surrounding the LED and results in multiple reflections and consequently absorption of light, thus reducing the amount of useful light exiting the LED. In addition, some of the light that exits the LED surfaces goes into undesired directions and is also wasted.

Another factor is related to white LEDs that employ an embedded phosphor. Some of the light that is emitted from the phosphor is reflected back to the LED and is wasted. In the case of high-power LEDs, the phosphor heats up (being close to the LED die), and its efficiency decreases.

Another factor is related to cases where the phosphor is not close to the LED die (i.e., remote phosphor). Significant part of the light that is emitted by the phosphor is directed back into the lighting device toward the LED and its surroundings and is reflected by the LED surfaces and by the surrounding surfaces inside the lighting device to various directions, resulting in multiple reflections and absorption that reduce the amount of useful light that is emitted from the phosphor.

U.S. Ser. No. 10/151,446 discloses a light-emitting device comprising a light source and an extractor element coupled to the light source. The extractor element includes at least in part a total internal reflection surface.

US 20120170303A1 and U.S. Pat. No. 8,579,466B2 employ a remote phosphor in a planar waveguide.

Efficacy of lighting devices is the main factor affecting their operating costs and their maximum achievable output. Reducing operating cost and increasing light output are especially important in the field of indoor farming. Therefore, there is a real need for improving the efficacy of LED-based grow lights by maximizing both the amount of light extracted from the LED and the efficiency of the optical system that delivers the light to the plant.

SUMMARY OF THE INVENTION

It is hence one object of the invention to disclose a lighting module for illuminating cultivated crops in indoor farming comprising at least one monolithic or multipart efficiency enhancing optical element (EEOE). The aforesaid EEOE further comprises: (a) a front portion comprising a spectrum conversion layer; (b) an optically transparent middle body portion having at least one light source embedded therewithin and configured to emit spectrally controllable radiation; said optically transparent middle body portion having an optically transparent side surface; (c) a back portion configured to reflect said radiation emitted by said spectrum conversion layer to said cultivated crops.

It is a core purpose of the invention to provide the back portion having a central area being adjacent to said optically transparent middle body portion configured for reflecting radiation propagating within said optically transparent middle body portion and a peripheral area configured for reflecting radiation emerged from said optically transparent middle body portion via said side surface; said side surface of said optically transparent middle body portion is configured for: (a) reflecting said radiation emitted by said at least one light source toward said front portion by total internal reflection (TIR); (b) refracting at least a part of said radiation emitted backward by said spectrum conversion layer and redirect said radiation emitted by said spectrum conversion layer outside said optically transparent middle body portion toward said peripheral area of said back portion; and (c) reflecting at least a part of said radiation emitted by said spectrum conversion layer, and redirecting said radiation emitted by said spectrum conversion layer into said optically transparent middle body portion toward said central area of said back portion.

A further object of the invention is to disclose the EEOE which is made of a polymeric material.

A further object of the invention is to disclose the polymeric material which is silicone.

A thriller object of the invention is to disclose the spectrum conversion layer which is made of a composite material containing a photoluminescent material.

A further object of the invention is to disclose the photoluminescent material which is phosphor.

A further object of the invention is to disclose the reflective layer which is made of a composite material containing titanium dioxide.

A further object of the invention is to disclose said composite material comprising silicone.

A further object of the invention is to disclose the side surface of said middle body portion which is at least partially provided with a layer of a spectrum conversion material being in an optical contact thereto.

A further object of the invention is to disclose the layer of spectrum conversion material releasably connectable to said EEOE.

A further object of the invention is to disclose the lighting module comprising a set of layers of spectrum conversion materials interchangeably connectable to said middle body portion of said EEOE; said set comprises a number of layers of spectrum conversion materials emitting radiation effective in growing predetermined cultivated crops.

A further object of the invention is to disclose the front surface of said EEOE provided at least partially with a relief optical element that manipulates light either by refraction or by diffraction; said relief optical element is configured for a function selected from the group consisting of concentrating radiation exiting said EEOE within said area to be illuminated, or angularly redistributing said radiation within said area to be illuminated.

A further object of the invention is to disclose the front surface of said middle body portion of said EEOE provided with at least one element of the following: a layer of spectrum conversion material and a layer of a transparent material having a relief on its front surface which are in an optical contact to said front surface.

A further object of the invention is to disclose the layer of spectrum conversion material comprising at least one sheet that is securable to the front surface of said middle body portion.

A further object of the invention is to disclose the reflective back portion which is curvilinear and configured for concentrating reflected radiation within said area to be illuminated.

A further object of the invention is to disclose the lighting module comprising a cover window configured for protecting said layer of a spectrum conversion material from environmental factors.

A further object of the invention is to disclose the cover window provided with a relief optical element on at least one surface thereof. The relief optical element is configured for a function selected form the group consisting of concentrating radiation exiting said EEOE within said area to be illuminated, angularly redistributing said radiation and splitting said radiation and any combination thereof.

A further object of the invention is to disclose the cover window which is releasably mountable.

A further object of the invention is to disclose the cover window which is securable to said lighting arrangement by means of a coupling pawl.

A further object of the invention is to disclose the cover which is slidably securable to said lighting module.

A further object of the invention is to disclose at least one light source comprising at least one LED mounted on a PCB attached to a base plate.

A further object of the invention is to disclose the base plate characterized by thermal conductivity providing dissipation of heat generated by said at least one LED.

A further object of the invention is to disclose a heat sink attached to said base plate that increases the dissipation of heat generated by said at least one light source.

A further object of the invention is to disclose the base plate provided with a reflector selected from the group consisting a specular reflective coating, a diffuse reflective coating, a specular reflective sheet affixed to said base plate, a diffuse reflective sheet affixed to said base plate and any combination thereof.

A further object of the invention is to disclose the light source comprising at least two groups of LEDs; each group comprises LEDs configured for emitting radiation within different spectrum ranges; light intensity of radiation emitted by each group is independently controlled in order to provide radiation of variable spectral distributions.

A further object of the invention is to disclose the lighting module comprising a color imaging camera for capturing multi-color and single-color images of crops, said single-color images are captured in illumination provided by turning on only one group of said at least two groups of LEDs; said images are analyzed to provide information about the plant stress state.

A further object of the invention is to disclose the optically transparent side surface defined by polynomial or piecewise linear function.

A further object of the invention is to disclose a method of manufacturing lighting module for illuminating cultivated crops in indoor farming comprising a monolithic efficiency enhancing optical element (EEOE). The aforesaid method comprises steps of: (a) providing a base plate, a thermal pad and a printed circuit board carrying at least one light source; said printed circuit board secured to said base plate with said thermal pad therebetween; (b) covering said at least one light source with a removable protecting layer, (c) pouring a composite of transparent silicone and a reflective material onto said printed circuit board and said base plate; (d) creating said back reflective portion of said EEOE configured to redirect radiation to said cultivated crops by curing said composite of transparent silicone and reflective material; (e) removing said removable protecting layer from said at least one light source; (f) providing a mold conformal to said optically transparent middle body of said EEOE; (g) mounting said mold on said back portion; (h) pouring a transparent silicone material into said mold; (i) creating said transparent middle body portion of said EEOE by curing said silicone material, (j) pouring a composite of transparent silicone and a photoluminescent material onto said cured transparent middle body, and (k) creating said front portion of said EEOE by curing said composite of transparent silicone and a photoluminescent material.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a lighting module for illuminating cultivated crops in indoor farming.

The following detailed description contains various embodiments and specifics. They are presented for the purpose of illustration and anyone of ordinary skill in the art will appreciate that many variations of the following details are within the scope of the invention.

Figure 1:
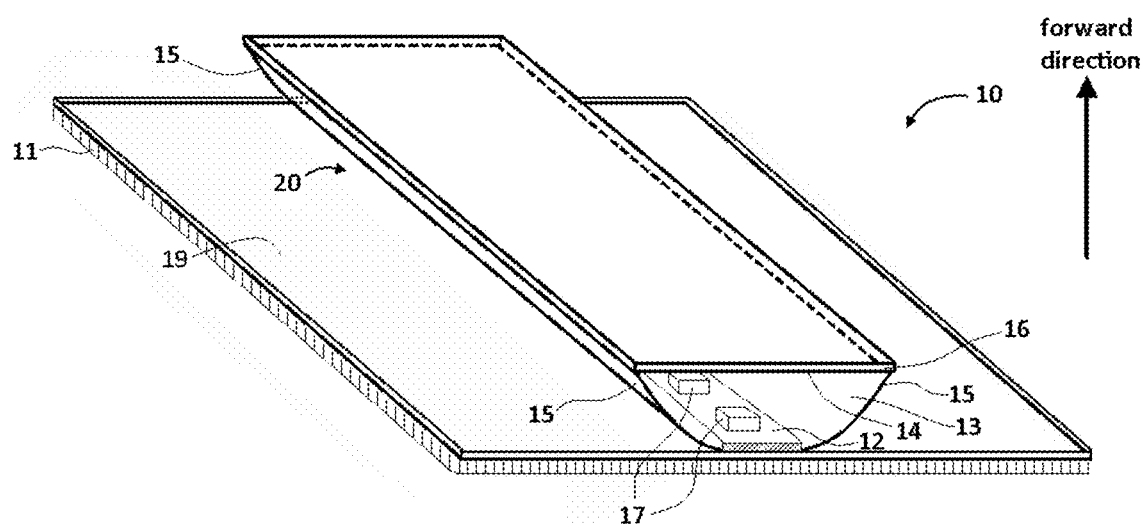
FIG. 1 is an isometric view of a lighting module.

Reference is now made to FIG. 1 presenting one embodiment of the invention. A lighting module 10 comprises: A printed circuit board (PCB) 12 attached to a planar base plate 11, a rectangular efficiency enhancing optical element (EEOE) 20. The aforesaid EEOE 20 is made of a polymeric material and comprises a front portion 16, a back portion 19, and a middle body portion 13. The back portion 19 of EEOE 20 is a reflective layer made of a composite polymeric material (typically silicone) containing a reflective material such as $TiO_2$ (Titanium dioxide). The reflective material can be different than TiO2, for example, $BaSO_4$ (Barium sulfate) or PTFE (Polytetrafluoroethylene). The front portion 16 of EEOE 20 is a spectrum conversion layer constituting a layer of a composite polymeric material (typically silicone) containing a photoluminescent material such as phosphor. The body 13 between the front portion 16 and the back portion 19 is transparent. According to an exemplary embodiment of the present invention, the EEOE 20 has a long dimension and a short dimension, a planar front surface, a stepwise planar back surface, and curved side surface 15. An array of LEDs 17 comprising blue, red, far red, and UV LEDs embedded inside the transparent body 13 of the EEOE 20 and electrically connected to the PCB 12. The index of refraction of the material of the EEOE transparent body 13 is higher than that of air and is closer to that of the LEDs material such that reflection of light from the LEDs walls is reduced and efficient light extraction from the LEDs is provided. According to one embodiment of the present invention, an encapsulation material is inserted between the EEOE and the LED to provide an optical contact between the EEOE and the LEDs. The transparent body 13 of the EEOE has a transparent side surface 15 having polynomial shape. The front portion 16 is in optical contact with the transparent body 13 of the EEOE so that there is no gap between the two. This reduces to minimum the reflection of light that hits the interface 14 between the transparent body 13 and the front portion 16, thus reducing waveguiding effects and light absorption inside the EEOE. Likewise, the central area of the back portion that is adjacent to the transparent body 13 is in optical contact with it so that there is no gap between the two. This reduces the total internal reflection of light that hits the back portion, thus reducing waveguiding effects and light absorption inside the EEOE. All these measures to reduce reflections from various surfaces reduce losses and increase the efficacy of the lighting module. The spectrum conversion material is typically made of phosphor or uses quantum dots and can be any other converter of narrow spectrum light to broad spectrum light and for the sake of brevity shall hereinafter be referred to as 'phosphor'. The phosphor may also be of the adhesive sheet type attached to the front surface of the EEOE's transparent body 13 instead of being dispersed inside the EEOE's front portion. The reflection of the reflective back portion of the EEOE is typically diffuse but can also be specular. The EEOE is designed to direct most of the light that emerges from the LEDs 17 and the light that is emitted by the phosphor toward generally the forward direction. The base plate 11 is typically made of Aluminum or another material with high thermal conductivity to also serve as a heat transfer interface to a heat sink that is connected on its back side.

Figure 2A:
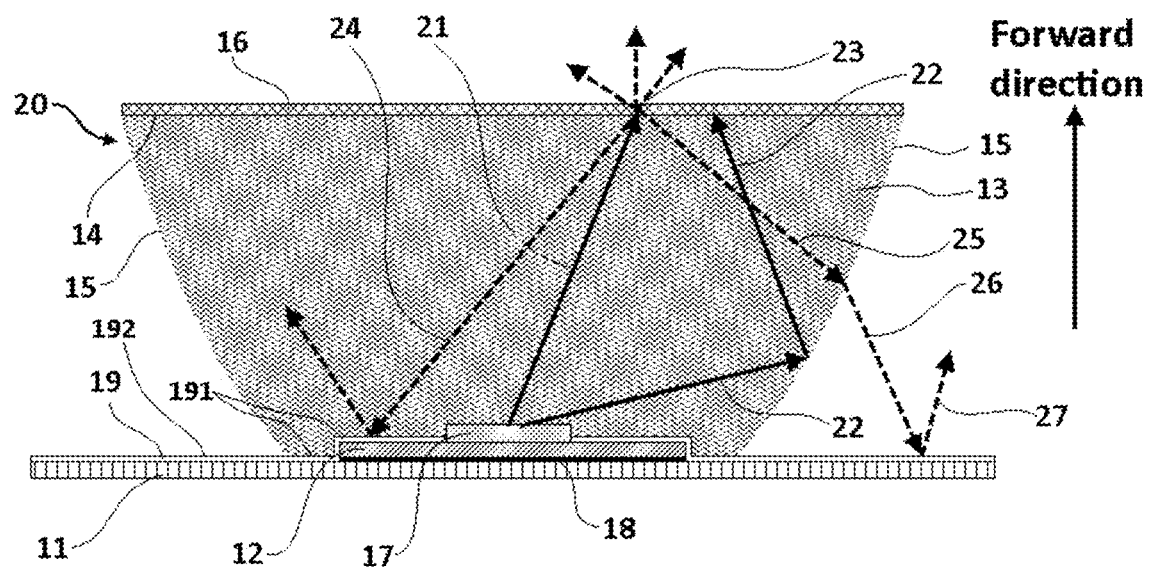
FIGS. 2a to 2c are cross-sectional views of a lighting module provided with an efficiency enhancing optical element having polynomially shaped side surfaces.

FIG. 2a presents a cross-section of the same embodiment. It illustrates how the light of the LED embedded in the transparent body 13 of the EEOE and the light emitted by the phosphor is efficiently out-coupled toward generally the forward direction. Both the base plate and the PCB are covered by the reflective back portion 19. The back portion 19 has a central area 191 being adjacent to the middle body portion 13 and a peripheral area 192. The central area 191 and the peripheral area 192 may have the same thickness or different thicknesses. The central area should be thin enough so that it does not block the light that emerges from the sides surfaces of the LEDs 17. The peripheral area should be thick enough so that it will not be too fragile and be resistant to environmental conditions. Two kinds of light rays that emerge from the LED 17 are illustrated. Ray 21 represents all the rays that emerge from the LED and go directly to the front portion 16 of the EEOE. Ray 22 represents all the rays that emerge from the LED and hit the side surface 15. The material from which the transparent body 13 of the EEOE is made of has an index of refraction greater than the surrounding material (typically air) and the shape of the side surface, determined by the degree and coefficients of the polynomial that defines it, is designed to reflect these rays toward the front portion 16 by a process of total internal reflection as illustrated by ray 22. Thus, most of the rays that emerge from the LED hit the front portion 16 either directly or after reflection from the side surface. According to the color of the rays that hit the front portion 16, they are either mostly absorbed by the phosphor, typically of color blue, or are mostly transmitted through the phosphor layer, typically of color red, deep red, and far red.

Light rays that are mostly absorbed by the phosphor are converted by it to a broad-spectrum diffuse light. Ray 21 is illustrated as a ray that is absorbed by the phosphor at point 23 and is then converted to broad spectrum rays that emerge from point 23 to all directions. Some of the light that emerges from the phosphor is emitted toward generally the forward direction and some is emitted backward into the EEOE. Some light is also reflected from surfaces backward into the EEOE. Some of the rays that go backward, represented by ray 24, hit the central area 191 of the back portion 19 of the EEOE and are reflected by it toward generally the forward direction. Other rays that go backward, represented by rays 25, hit the transparent side surface 15 and are refracted by it. The shape of the side surface is designed to direct these refracted rays, represented by ray 26, to the peripheral area 192 of the back portion that reflects them toward generally the forward direction as illustrated by ray 27. With this design a very high percentage of the light emitted by the LEDs and the phosphor is coupled-out toward the forward direction resulting in a very high Photosynthetic Photon Efficacy (PPE) value.

Figure 2B:
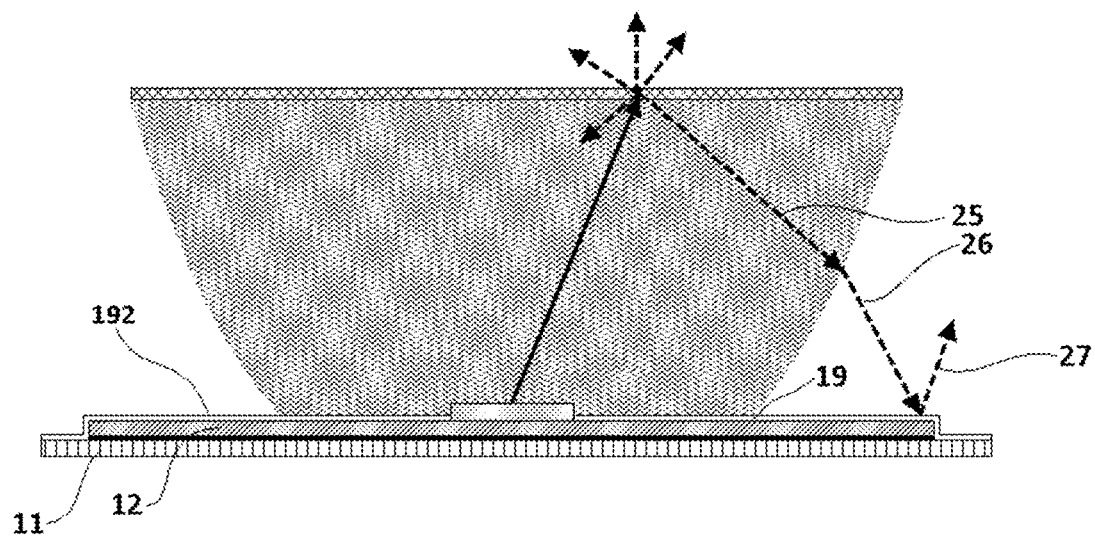

FIG. 2b shows a cross-section of an embodiment where the PCB 12 is wider than the back of the transparent body 13 of the EEOE so part of the PCB is covered by the peripheral area 192 of the back portion 19.

Figure 3A:
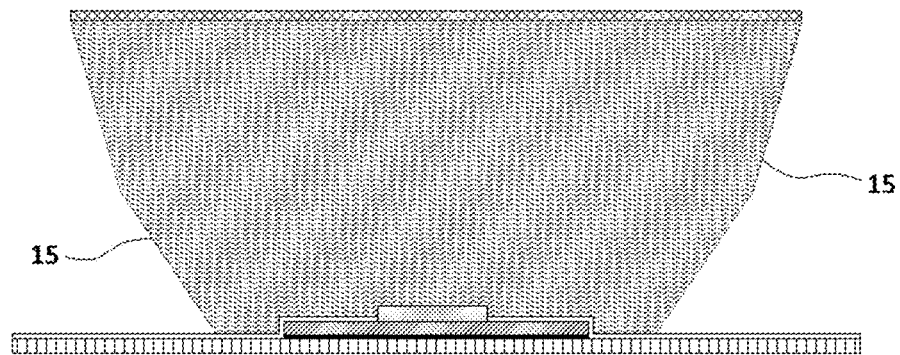
FIGS. 3a and 3b are cross-sectional views of a lighting module provided with an efficiency enhancing optical element having side surfaces shaped in a piecewise linear manner and broad-spectrum conversion material thereon.

In some embodiments the side surface 15 has piecewise linear shape with two or more segments as depicted in FIG. 3a. Although a side surface with polynomial shape offers, in general, more freedom in the design which may result in a more efficient out-coupling, the piecewise shape gives almost the same efficiency but is normally less expensive to manufacture.

Figure 2C:
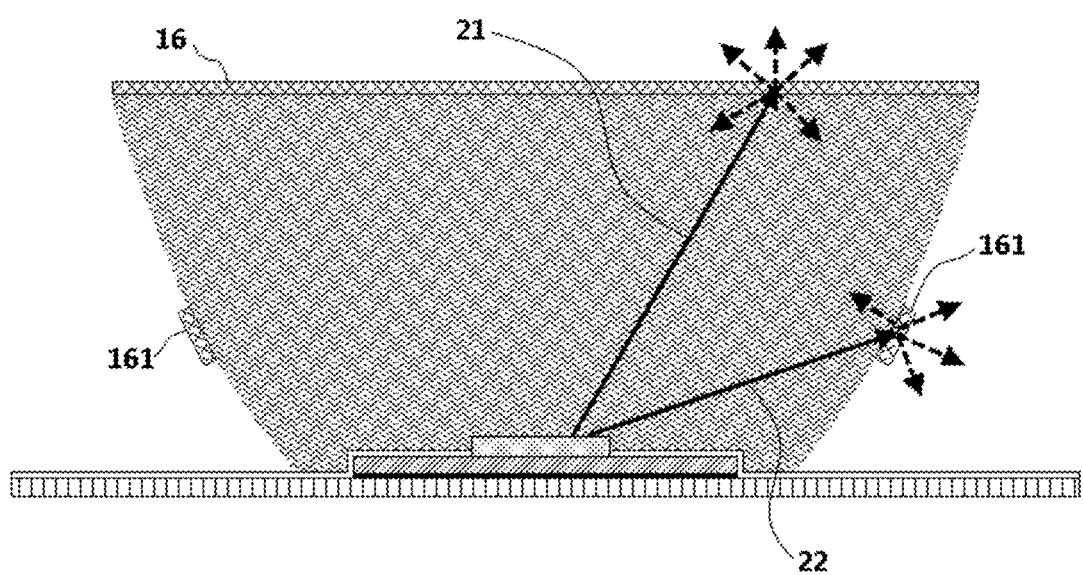
Figure 3B:
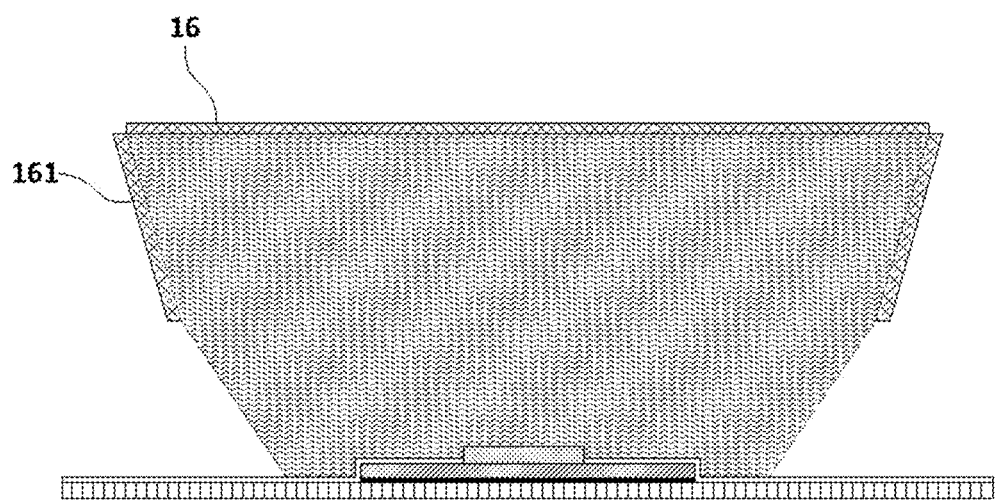

In some embodiments a phosphor layer 161 also covers parts of the side surfaces as depicted in FIGS. 2c and 3b.

Figure 4A:
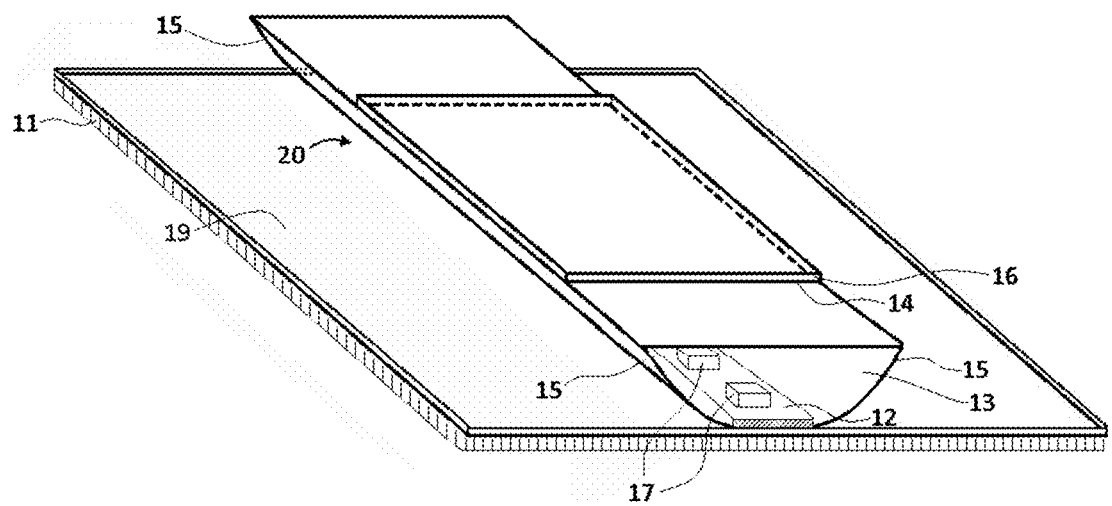
FIG. 4a is an isometric view of a lighting module provided with a broad-spectrum conversion material at least partly covering a front surface of the transparent middle body of an efficiency enhancing optical element.

In some embodiments the phosphor layer 16 does not cover the front surface of the transparent body 13 of the EEOE or covers only part of it as depicted in FIG. 4a. In the embodiment depicted in FIG. 4a the phosphor covers only areas of the EEOE where there are LEDs that need conversion, typically part of the blue LEDs. This arrangement decreases the loss caused by the phosphor to the light that need not be converted and also reduces phosphor cost. The specific areas that are covered by the phosphor depend on the arrangement of the LEDs on the PCB. In the embodiment of FIG. 4a the blue LEDs are positioned in the center part of the PCB and the other LEDs are positioned in the outer part. In other embodiments groups of LEDs whose light needs to be converted by the phosphor are embedded between groups of other LEDs whose light need not be converted and thus the positions of areas that are covered by the phosphor on the front surface of the transparent body 13 of the EEOE match the positions of the LEDs whose spectrum needs to be converted. When groups of same color LEDs are separated from each other on the PCB, color mixing is achieved at some distance from the EEOE and not inside the EEOE. In all cases the light that reaches the plant shelf is approximately a uniform mixture of all colors due to the distance it travels from the lighting module to the shelf even if at the EEOE the different colors might still be distinguished.

Figure 4B:
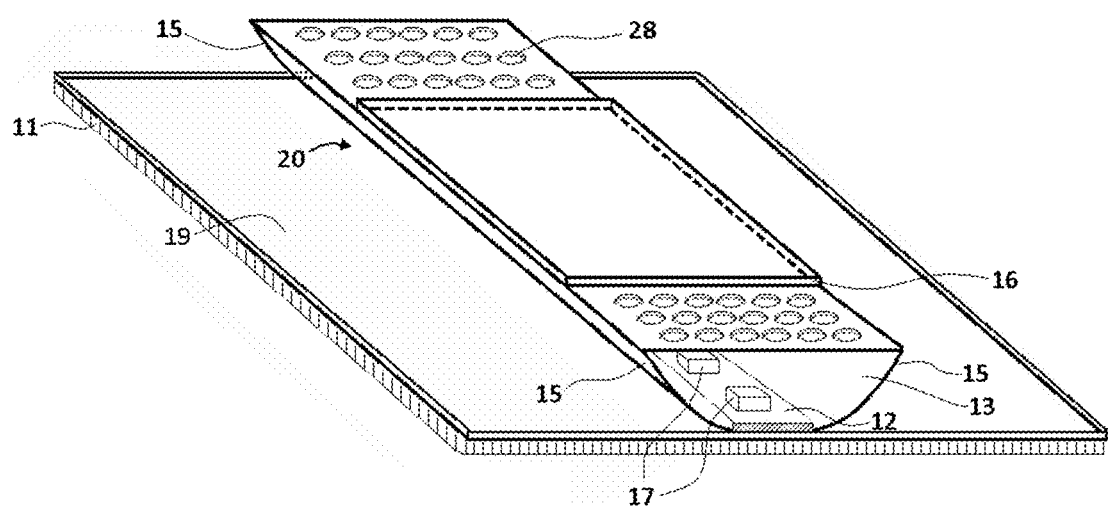
FIG. 4b is an isometric view of a lighting module provided with a broad-spectrum conversion material at least partly covering a front surface of the transparent middle body of an efficiency enhancing optical element and transparent relief with hemispheres on at least part of the front surface not covered by spectrum conversion material.
Figure 19:
FIG. 19 is a schematic diagram of a sheet of transparent material with a relief optical element on its front surface and an adhesive layer on its back surface to be affixed on front surface of an efficiency enhancing optical element.
Figure 20:
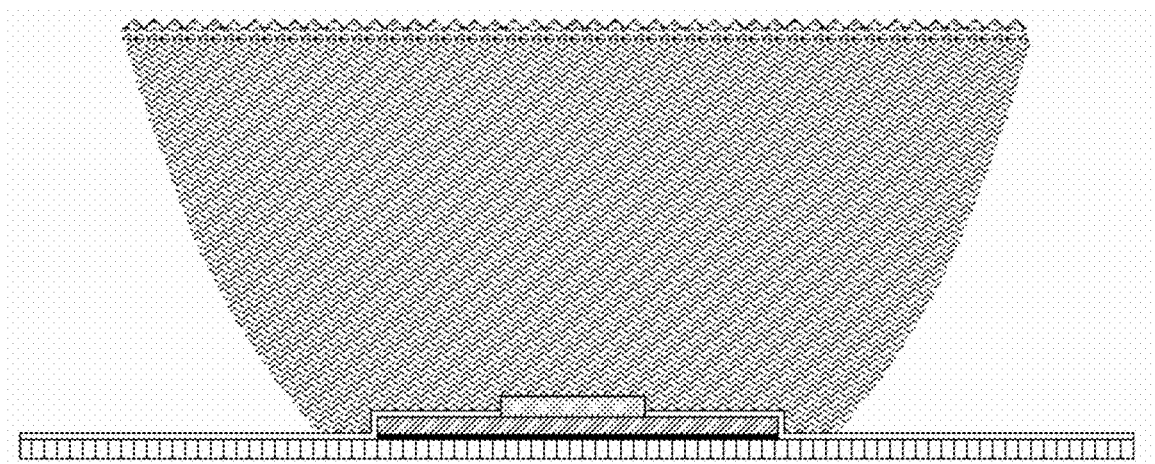
FIG. 20 is a cross-sectional view of a lighting module provided with a relief optical element on its efficiency enhancing optical element that is either affixed on its front surface or generated in it by a molding process.

In some embodiments the front surface of the EEOE is provided at least partially with a relief optical element that manipulates light. This relief can be molded in the surface itself or be attached as a sheet to the surface (FIGS. 19 and 20). FIG. 4b shows an example where some areas of the EEOE front surface include small transparent hemispheres 28 that redirect some of the light into specific directions and increases the out-coupling of light from the EEOE. FIG. 20 shows a cross-section with another example of a relief. A relief on the front surface of the EWE also reduces waveguiding effects and increases the total efficiency of the EEOE and the efficacy of the lighting module.

The spectrum of the disclosed lighting module is controlled by several means. The major means is the division of colors between the different LEDs that are connected to the PCB. These LEDs may comprise any combination of blue, red, deep red, far red, and UV LEDs. The overall spectrum of the light emitted from the module depends on the relative number of LEDs of each color. Another means of controlling the spectrum is by driving different groups of LEDs with different currents and by individually controlling each of these currents. This allows adapting the spectrum of the light of the lighting module to the needs of the specific plants according to the growth stage (e.g., seeding, flowering, etc.) and the time of the day.

The current invention provides other means of controlling the overall spectrum. By covering different areas of the surfaces of the EEOE with phosphor, some of the LEDs light is converted to a broad spectrum that is added to the LEDs spectrum. Different phosphor coverage provides different overall spectrum with the same LEDs. Thus, keeping all components of the lighting module, except for the phosphor, unchanged, it is possible to modify the spectral content of the module just by changing the ratio between areas that are covered with phosphor and areas that are not covered and also by changing the type of the phosphor or the concentration or size of its particles.

Figure 5A:
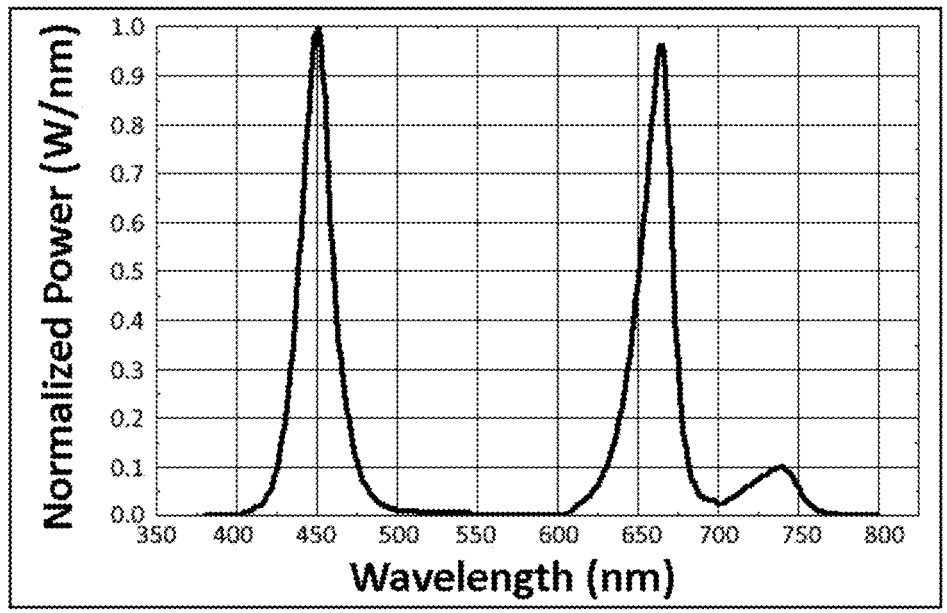
FIG. 5a is a spectral graph of light emission from a lighting module provided with far red LEDs, deep red LEDs, and blue LEDs.
Figure 5B:
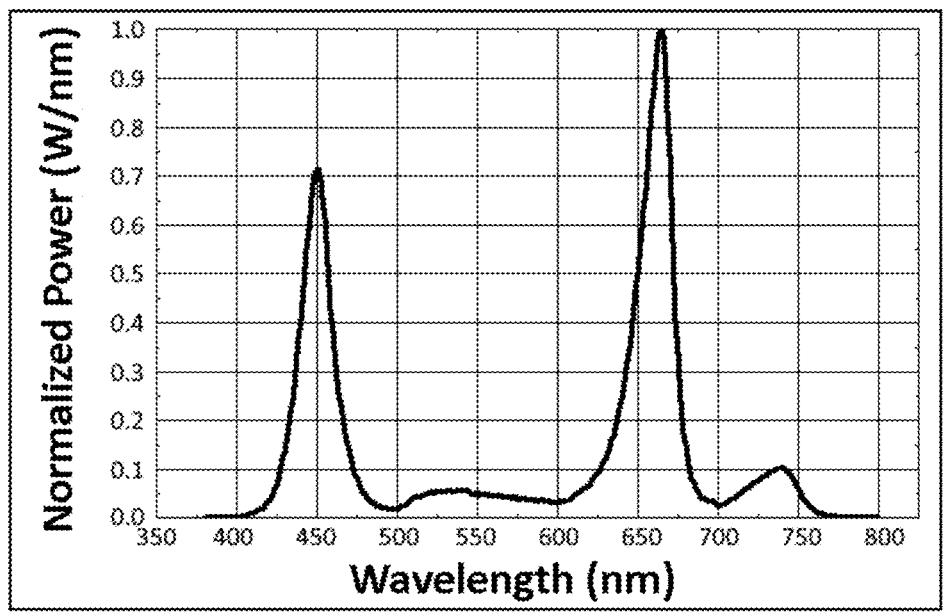
FIGS. 5b to 5d are spectral graphs of light emission from a lighting module provided with far red LEDs, deep red LEDs, blue LEDs and a broad-spectrum conversion material excited by blue LEDs.
Figure 5C:
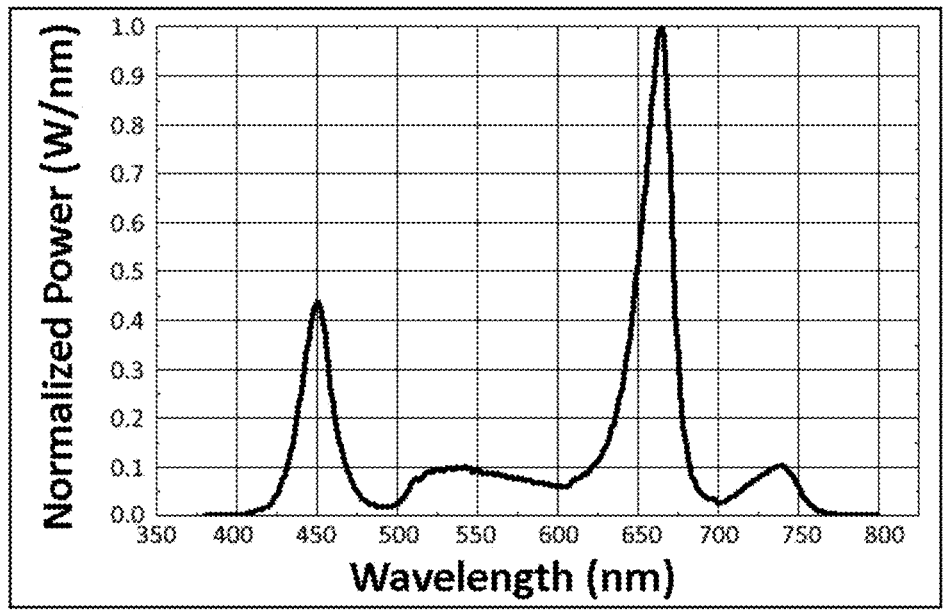
Figure 5D:
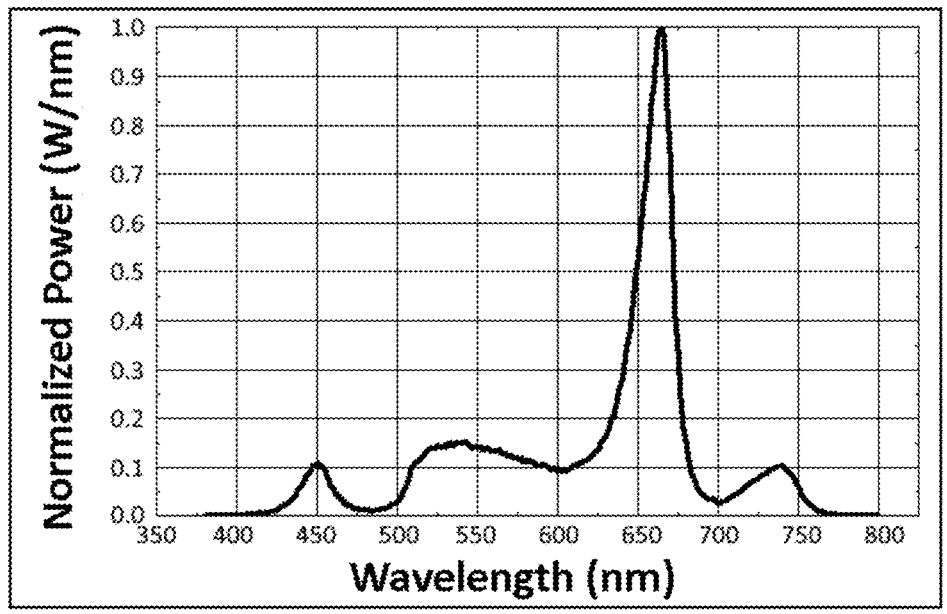

FIGS. 5a-d show how the spectrum is changing by different coverages of blue LEDs with phosphor in a specific case. FIG. 5a shows a graph of a typical spectrum of the light emitted from the module with red and blue LEDs without any phosphor. The next figures show how this spectrum changes with different phosphor coverages. FIG. 5b shows a graph of a typical spectrum of the light emitted from the module where the phosphor covers 30% of the blue LEDs. In this case the red portion of the spectrum (between 620 nm-700 nm) constitutes about 54% of the whole spectrum, the green portion of the spectrum (between 500 nm-620 nm) constitutes about 9% of the whole spectrum, and the blue portion of the spectrum (between 400 nm-500 nm) constitutes about 37% of the whole spectrum. In this case the estimated PPE of the module is about 2.8 µmol/J FIG. 5c shows a graph of a typical spectrum of the light emitted from the module where the phosphor covers 60% of the blue LEDs. In this case the red portion of the spectrum constitutes about 57% of the whole spectrum, the green portion of the spectrum constitutes about 19% of the whole spectrum, and the blue portion of the spectrum constitutes about 24% of the whole spectrum. In this case the estimated PPE of the module is about 2.74 µmol/J. FIG. 5d shows a graph of a typical spectrum of the light emitted from the module where the phosphor covers 100% of the blue LEDs. In this case the red portion of the spectrum constitutes about 63% of the whole spectrum, the green portion of the spectrum constitutes about 30% of the whole spectrum, and the blue portion of the spectrum constitutes about 7% of the whole spectrum. In this case the estimated PPE of the module is about 2.7 µmol/J.

Figure 6A:
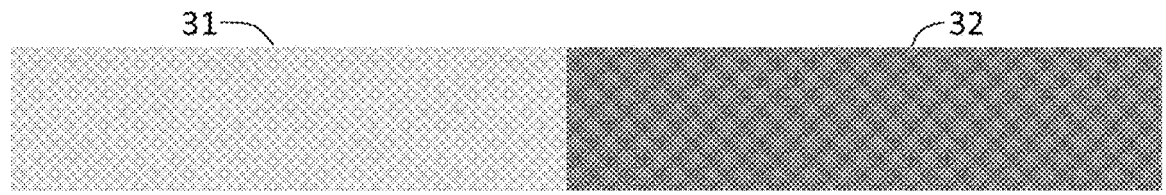
FIGS. 6a to 6c illustrate arrangements including a white phosphor and a red phosphor on the front surface of the transparent middle body of an efficiency enhancing optical element excitable by blue LEDs and a resulting spectrum (6c).
Figure 6B:
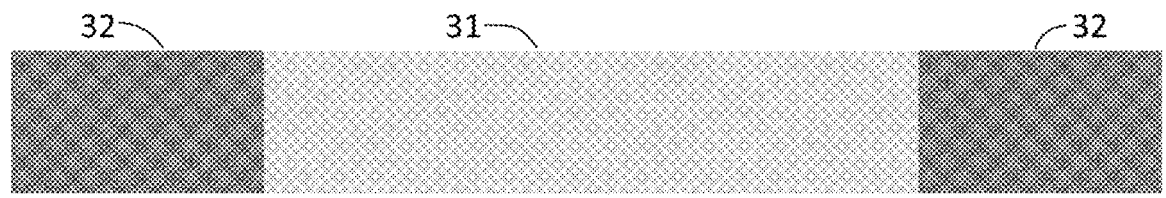

In some embodiments, more than one type of phosphor is used. FIGS. 6a and 6b present two types of phosphor at the front portion of the EEOE. A white phosphor 31 converts blue light to a broad-spectrum white light and a red phosphor 32 converts blue light to red light. In this case the red LEDs are usually unnecessary.

Figure 6C:
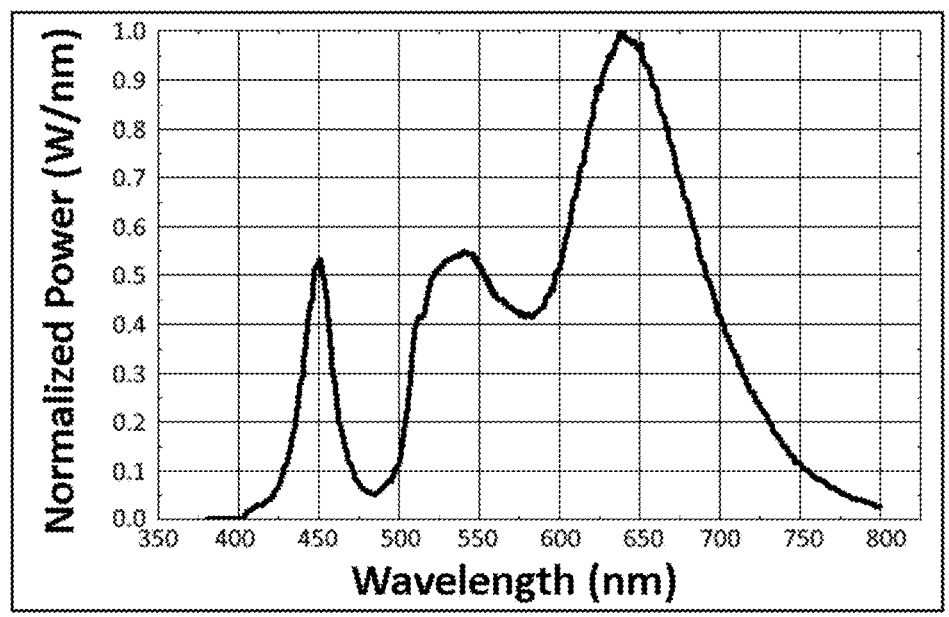

In FIG. 6a the white phosphor 31 occupies about one half of the front portion of the EEOE and the red phosphor 32 occupies the other half. In FIG. 6b the white phosphor 31 occupies the central part of the front portion of the EEOE and the red phosphor 32 occupies the two edge parts of the front portion. Other divisions between white phosphor and red phosphor are also possible. FIG. 6c shows the resulted spectrum of a case where all the LEDs are blue and the white phosphor and red phosphor each occupies about half the area of the front portion.

Figure 7:
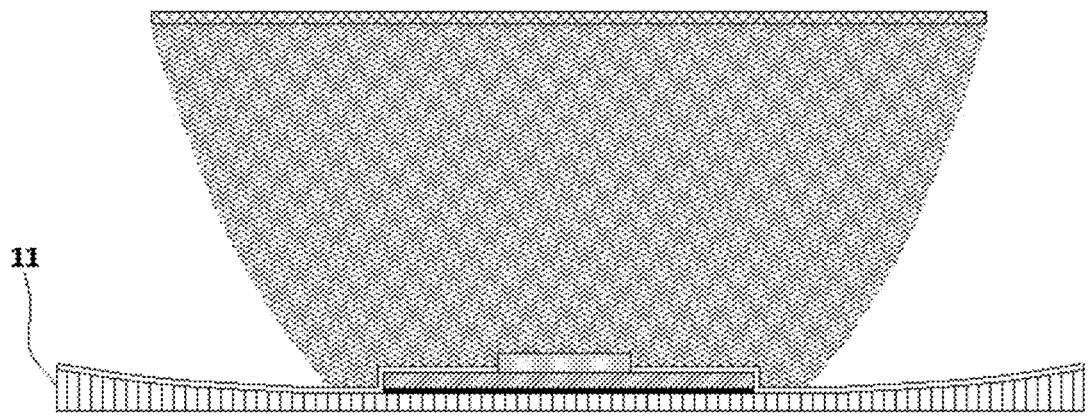
FIG. 7 is a cross-sectional view of a lighting module provided with a curvilinear base plate and reflecting layer.

FIG. 7 is a cross section of another embodiment of the lighting module where the base plate 11 and the reflective back portion of the EEOE are curved along the short dimension. This allows concentrating the reflected light to a narrower area on the plant shelf by reducing the angular spread of the reflected light.

Figure 8:
FIG. 8 is a cross-sectional view of a lighting module provided with a covering planar protecting window.
Figure 8:
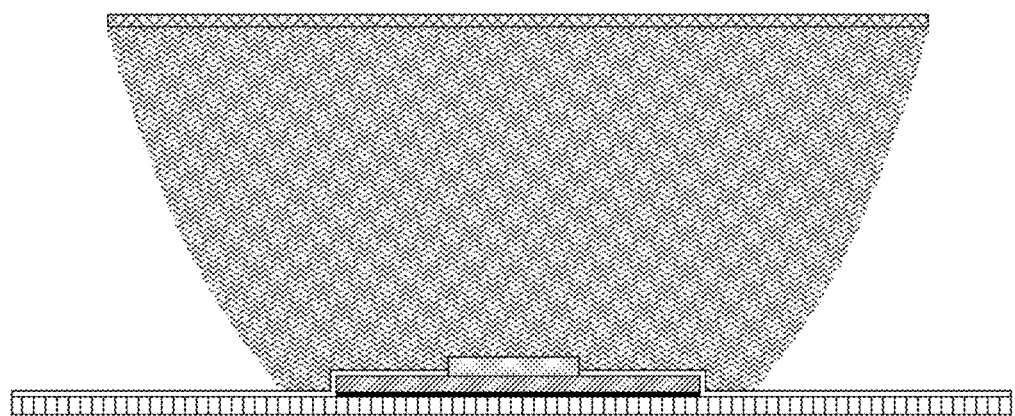

FIG. 8 is a cross section of an embodiment of the lighting module where there is a cover window 41 over the module.

The cover window serves as a protecting window. In some embodiments the cover window has a relief on its front or back surface that serves as secondary optics. Depending on the shape of the relief elements, the light that goes through a cover window with a relief is directed to different directions.

Figure 9A:
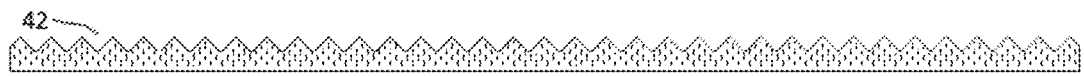
FIGS. 9a to 9c are side schematic views of exemplary embodiments of relief protecting windows serving as secondary optical elements.
Figure 9B:
Figure 9C:

FIGS. 9a-c show three examples of cover window with secondary optics. A symmetrical relief 42 directs the light equally into two directions. An asymmetrical relief 43 directs more light into one direction. The orientation of the reliefs pattern can be along the long axis of the EEOE, the short axis of the EEOE, or along any other direction. The relief may also have other shapes that can control the light distribution, for example, Fresnel lenses or various kinds of diffraction gratings and other diffractive elements. The relief may have different patterns on different areas to form a specific light distribution on the plant shelf as the relief 44 in FIG. 9c The cover window with secondary optics also contributes to mixing the different colors that are generated by the LEDs on the plant shelf.

Figure 10A:
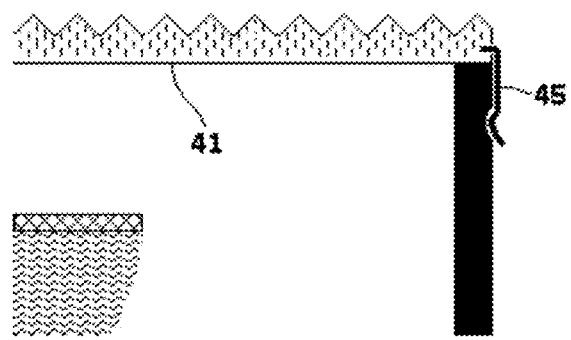
FIGS. 10a and 10b illustrate fastening arrangements of a replaceable secondary optical element.
Figure 10B:
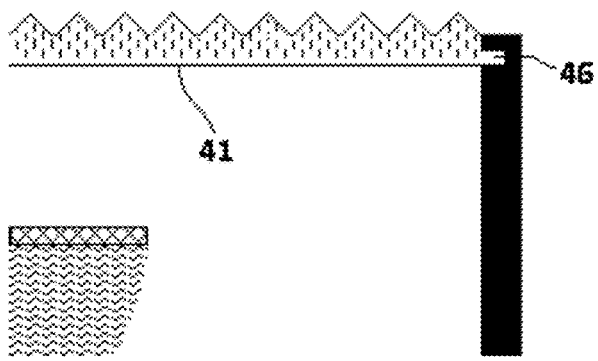

In some embodiments the cover window 41 is fitted over the lighting module in a way that allows it to be easily replaced. FIG. 10a shows one method to fit the cover window over the lighting module with spring clips 45. FIG. 10b shows another method where the window slides into position through a slot 46. Other types of attachments that allow easy replacement are also possible. This allows to use the same lighting module with different types of secondary optics so that the same lighting module can be used for different purposes with different requirements on the light distribution.

Figure 11:
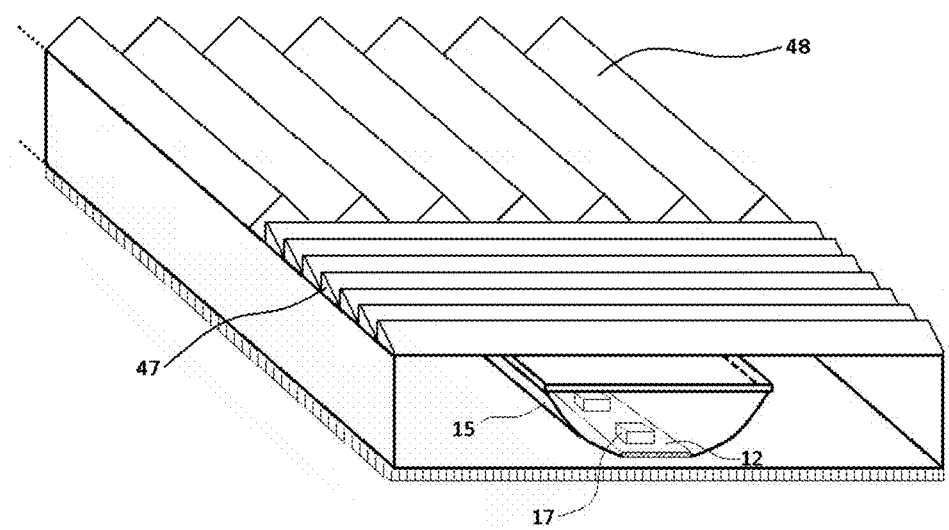
FIG. 11 is an isometric view of a lighting module provided with a protecting window with secondary optics of two kinds.

FIG. 11 illustrates an embodiment of the lighting module where the cover window serves as secondary optics with two types of reliefs. Relief 47 whose light deflecting elements are along the short dimension of the rectangular EEOE is asymmetrical and directs the light from the narrow edge toward the center of the shelf and relief 48 whose light deflecting elements are along the long dimension of the rectangular EEOE is symmetrical and affects the light at the center of the module.

Figure 12:
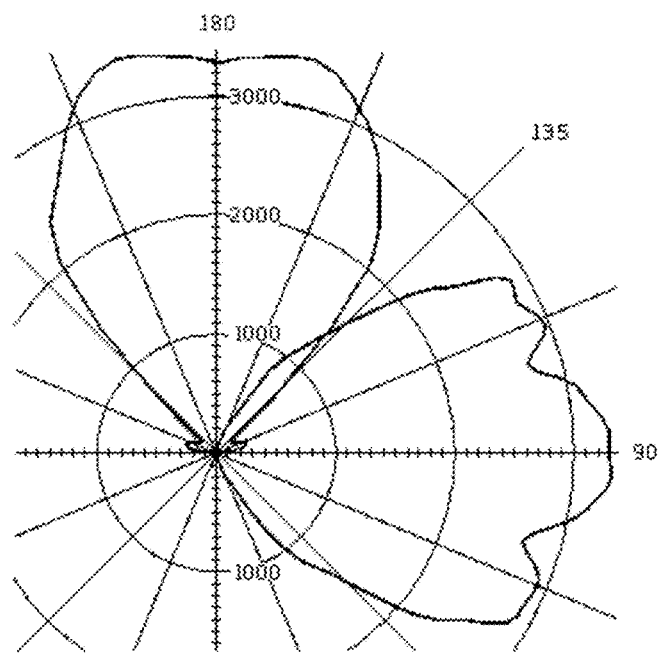
FIG. 12 is a graph of angular distribution light intensity produced by a lighting module with secondary optics and a curved reflecting layer.

FIG. 12 shows a graphical illustration of the light intensity angular distribution of a lighting module with a secondary optics cover window and a curved reflective back portion. The curved reflective layer narrows the angle of the light distribution is one dimension (shown around 180 deg.), and the secondary optics narrows the angle of the light distribution is the other dimension (shown around 90 deg.). The resulted angular distribution is approximately the same in both dimensions. A narrow angular distribution is important in configurations where the distance between the plant shelf and the lighting module is large so that most of the light will be concentrated on the shelf.

Figure 13:
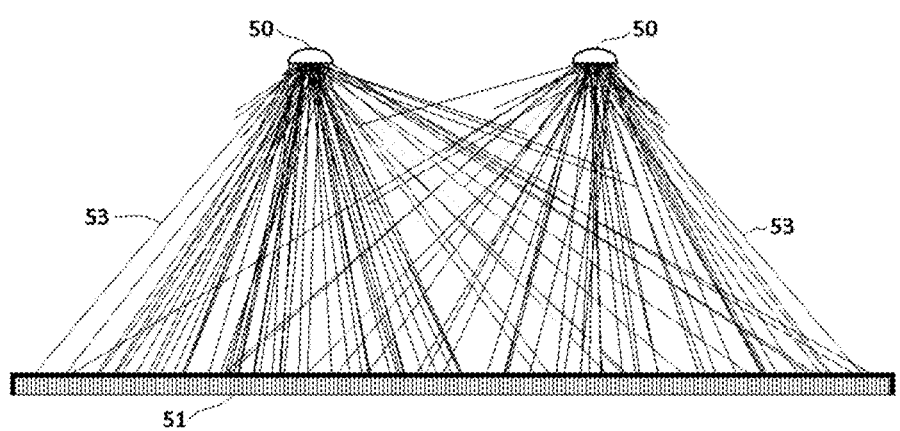
FIG. 13 illustrates numeric modelling of an arrangement of two lighting modules provided with protecting windows carrying asymmetrical reliefs in order to produce a confined illumination of an area of interest.

FIG. 13 shows a plant shelf 51 with two lighting modules 50 each with asymmetrical secondary optics window covering it. The elements of which the secondary is constructed are rectangular prisms with two surfaces of different angles. This maximizes the light that reaches the area of the shelf where the plants reside and minimizes that light outside this area, thus increasing the energy efficiency of the system. This is illustrated by the rays 53 that are traced from the modules to the shelf. The exact prisms' surface angles depend on the distance between the shelf and the lighting modules.

Figure 14:
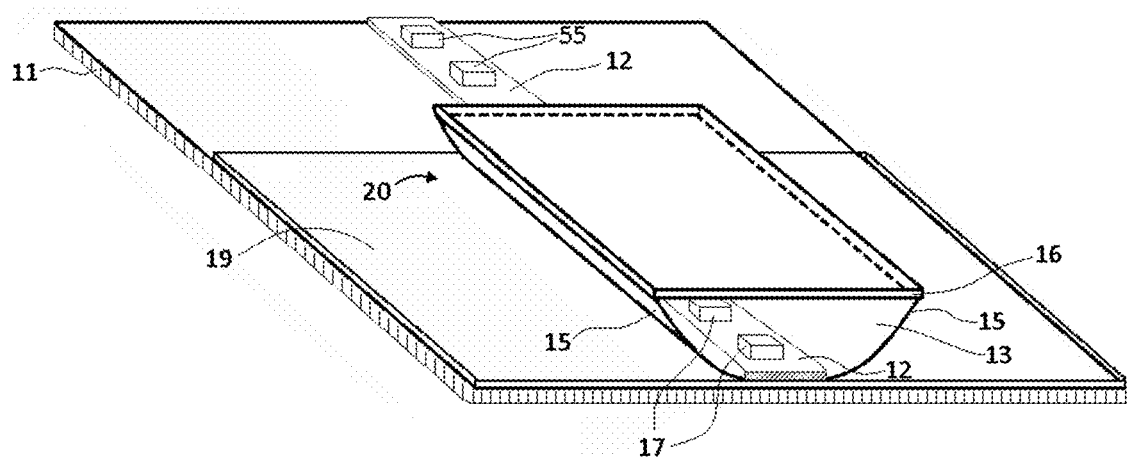
FIG. 14 is an isometric view of a lighting module provided with LEDs carried by a PCB and partially not covered by an efficiency enhancing optical element.

FIG. 14 presents an embodiment of the current invention where some LEDs 55 are positioned in an area of the PCB 12 that is not covered by the EEOE 20. For example, LEDs that emit light in a wavelength that is absorbed by the EEOE material. The light emitted by these LEDs goes directly to the plant shelf without being affected by the EEOE and without conversion by the phosphor.

Figure 15:
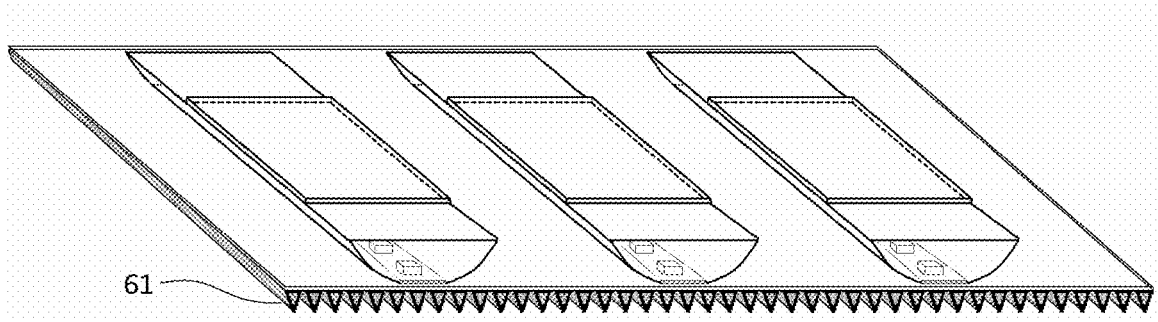
FIG. 15 is an isometric view of a multi-module fixture.

FIG. 15 presents an embodiment where several lighting modules are enclosed in one fixture to increase the amount of light illuminating the plant. The fixture employs a common base plate to all the lighting modules. The lighting modules may be identical or comprise different kinds of LEDs, different EEOEs, different kinds of phosphor, and use different kinds of secondary optics. This allows better control of the overall spectrum. It also allows moving along the locus from high value of the Color Correlation Temperature (CCT) to low CCT value by changing currents through different LEDs groups in different lighting modules inside the fixture. This type of multi-module lamp can be very useful for circadian lighting applications. The high optical efficiency of the enclosed lighting module means that less energy is converted to heat and consequently only passive cooling is needed to remove the heat from the system as illustrated by heat sink 61 attached to the base plate.

Figure 16:
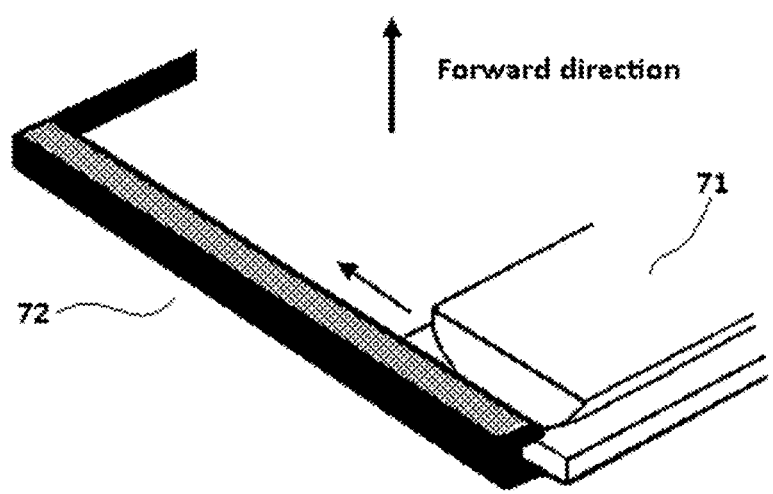
FIG. 16 illustrates sliding a lighting module into a rail allowing a combination of a plurality of lighting modules into a configurable multi-lamp module.

FIG. 16 presents one side of a frame (other side is symmetrical) that can hold several lighting modules to create a multi-module lamp. This frame allows easy configuration of the lamp by sliding one or more lighting modules 71 into that rail 72 and position them side by side with or without a distance between them. This makes it possible to adjust the size of the illuminated area according to needs.

Figure 17A:
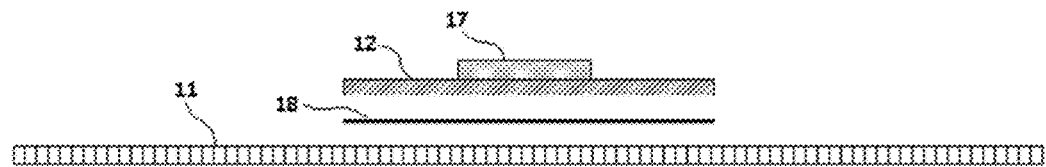
FIGS. 17a to 17d illustrate a method of making a lighting module.
Figure 17B:
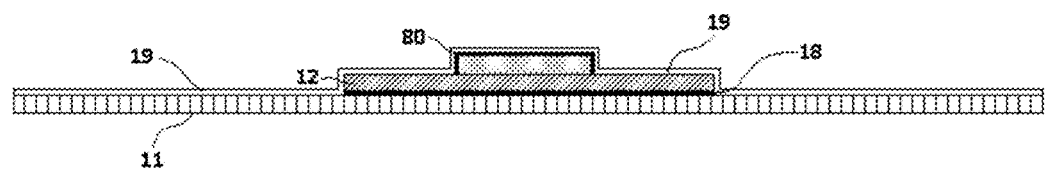
Figure 17C:
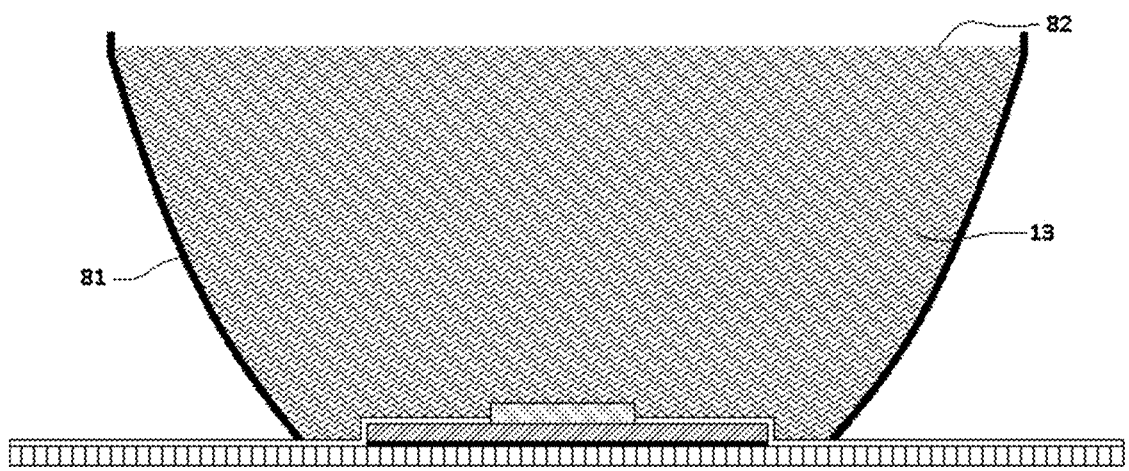
Figure 17D:
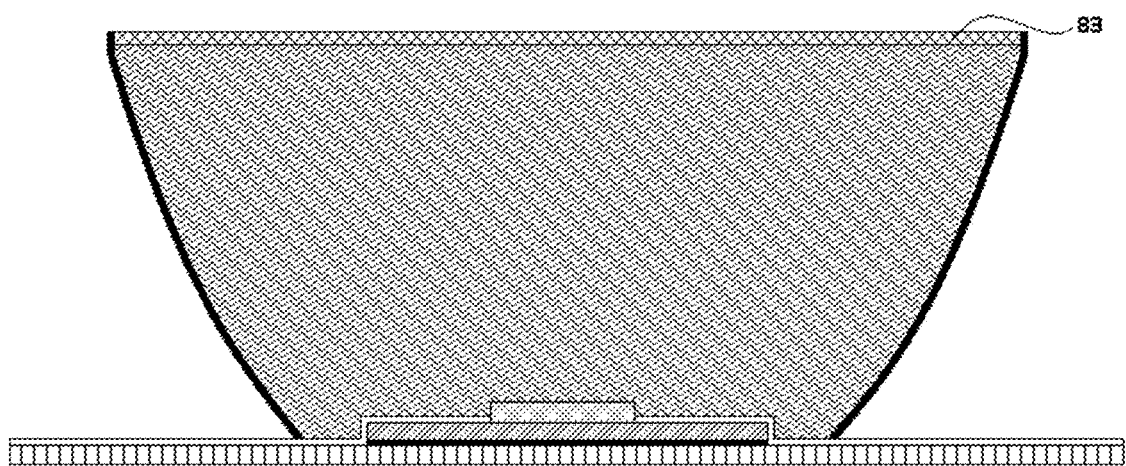

Reference is now made to FIGS. 17a-d presenting a process of making an embodiment of the lighting module FIG. 17a presents three separate components, a base plate 11 also employed as a heat transfer interface to a heat sink, a PCB 12 with LED 17 electrically connected to it, and a thermal pad 18 to be affixed between the PCB 12 and the base plate 11 to provide good thermal conductivity between the two so that the heat produced by the LED is dissipated. FIG. 17b presents the process of creating the reflective layer; the PCB is affixed to the base plate with the thermal pad between them, the LED is covered with a protecting layer 80, and then a highly reflective compound, typically a silicone/TiO$_2$ composite, is poured over the PCB and base plate and creates the reflective layer 19 by a casting process. The reflective layer 19 can also be created by a process of conformal coating of the base plate and the PCB, or by a combination of the two processes, for example, conformal coating of the PCB to achieve a thin enough layer that does not block the LED light and a casting process on the base plate to achieve a thick enough layer that provides good environmental protection. The reflective layer is typically wider than the back side of the EEOE transparent body 13 to an extent that allows most of light that is scattered back to hit the reflective layer and be reflected toward the forward direction. After curing layer 19, the protecting layer 80 is removed. FIG. 17c presents a mold 81 that is placed on top of the reflective layer 19; a transparent silicone 82 is poured into the mold and after curing constructs the transparent body 13 of the EEOE. The shape of the mold is defined with either a polynomial or a piecewise linear function. FIG. 17d presents the stage of pouring a silicone/phosphor mixture 83 on the front surface of the transparent body 13 of the EEOE to construct the front portion 16 as a broad-spectrum conversion layer.

Figure 18A:
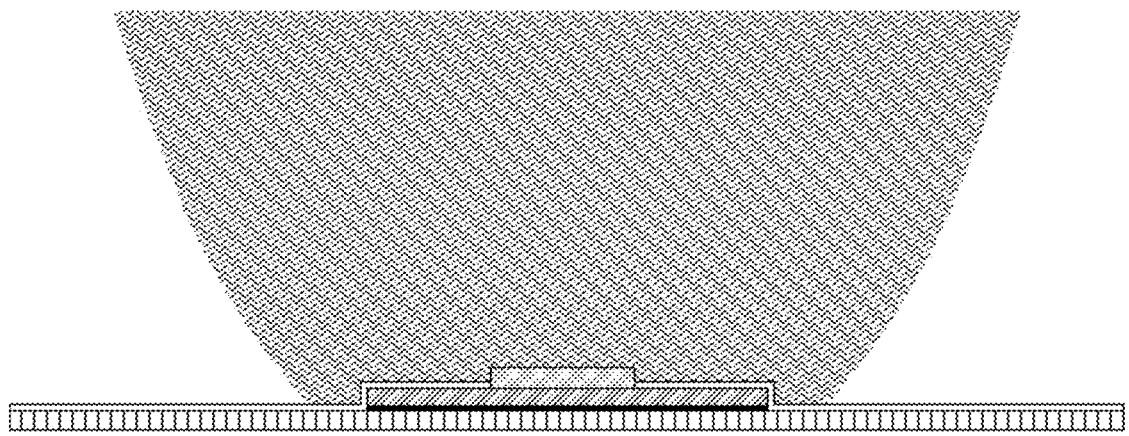
FIGS. 18a and 18b are cross-sectional views of lighting module with and without a layer of broad-spectrum conversion material on the front surface of the transparent middle body of the efficiency enhancing optical element.
Figure 18B:
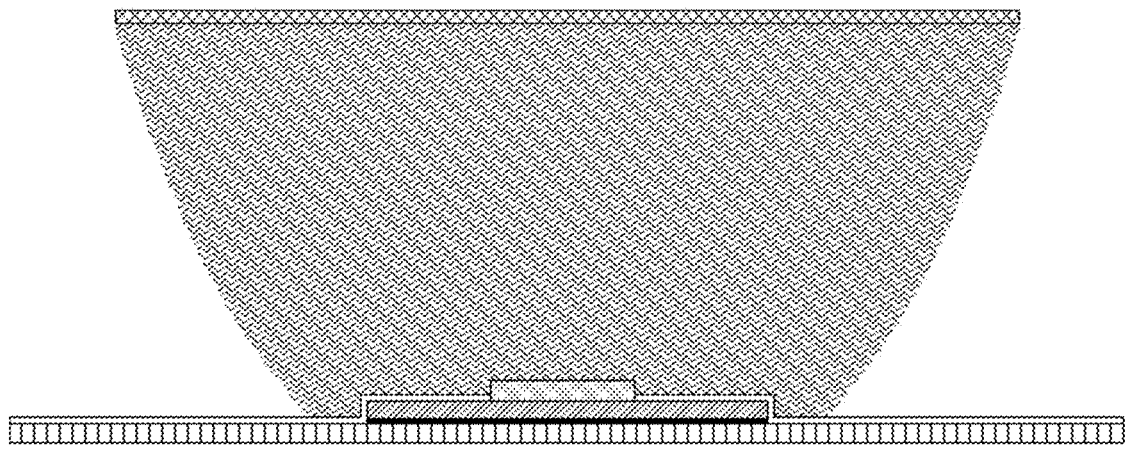
Figure 18C:
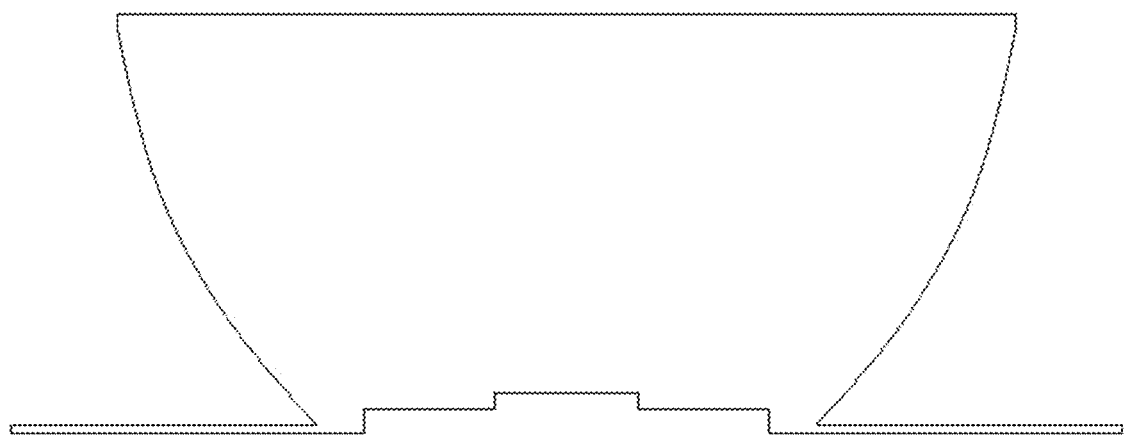
FIG. 18c is a cross-sectional view of the contour of the monolithic silicone constituting efficiency enhancing optical element.
Figure 18D:
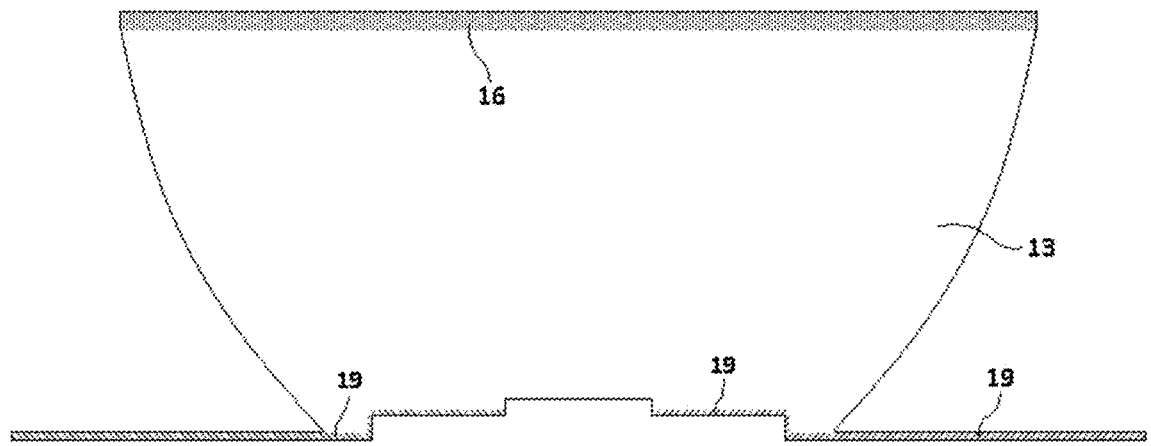
FIG. 18d is a cross-sectional view of the contour of the monolithic silicone constituting efficiency enhancing optical element with different portions thereof.

FIGS. 18a and 18b show cross-sections of the module after mold removal. FIG. 18a is a cross-section of an area not covered with a spectrum conversion layer and FIG. 18b is a cross-section of an area with the spectrum conversion layer. FIG. 18c depicts the contour of the whole silicone element which shows that the EEOE is actually a single monolithic piece of silicone with different characteristics in different portions FIG. 18d shows the three different portions of the EEOE, specifically, a transparent silicone body 13, a reflective layer, e.g., a silicone/TiO$_2$ composite, as a back portion 19, and silicone/phosphor mixture as a front portion 16. Elements 13, 19 and 16 are arranged into a discrete whole member. This process yields a very robust and moisture resistant module and provides excellent protection to the PCB electronics and the LEDs. Such a module can be used without any additional protection like box or protecting window.

Various manufacturing processes can achieve a similar structure of the lighting module, for example, casting, injection molding, and 3D printing.

FIG. 19 shows an example of optical element 91 made of silicone or a similar material with a relief on its front surface to be affixed to the front surface of the EEOE.

FIG. 20 shows a cross-section of the EEOE with a relief on its front surface. This relief might be a separate sheet, such as shown in FIG. 19, that is affixed to at least part of the front surface of the EEOE or be molded on at least part of its front surface during the building process of the EEOE. The relief provides additional optical activity such as out-coupling, converging, diverging, or splitting the light.

Figure 21:
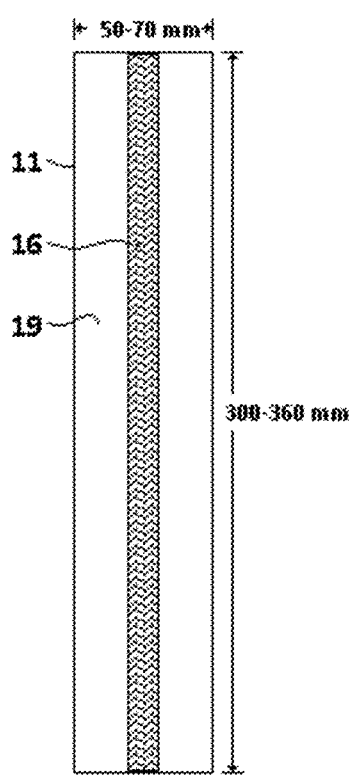
FIG. 21 is a top view of an embodiment of the lighting module illustrating the front portion and the reflective back portion of an efficiency enhancing optical element.

FIG. 21 is a top view of a specific embodiment of the lighting module. In this embodiment the module has a short dimension of 50-70 mm and a long dimension of 300-360 mm.

The rectangular EEOE with its back portion 19 and front portion 16 is shown on top of the base plate 11.

Figure 22A:
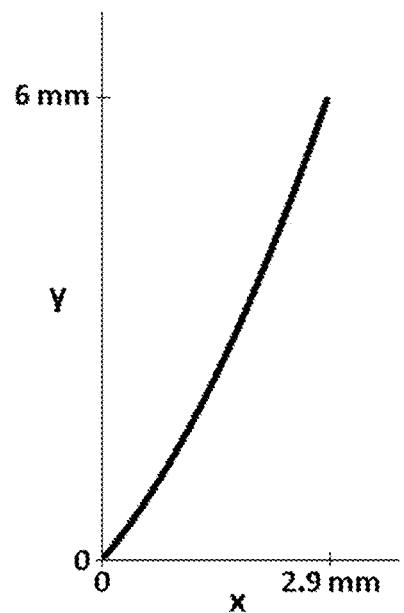
FIGS. 22a and 22b are graphs exemplary polynomials defining side surfaces of an efficiency enhancing optical element.
Figure 22B:
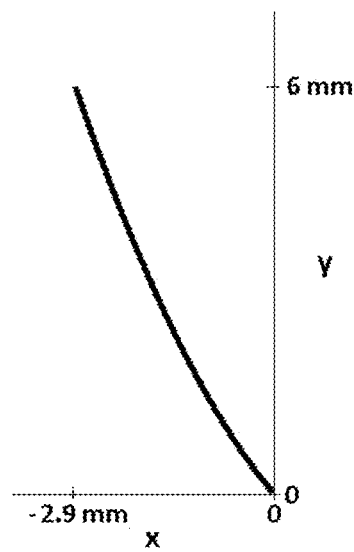

FIGS. 22a and 22b show polynomial functions y vs. x that define the shape of a specific side surface of the transparent body of the EEOE. In this case the polynomial that defines the right side of the surface (FIG. 22a) is given by:

$$y=0.3x^2+1.2x; x=0 \ldots 2.9 \text{ mm},$$

and the polynomial that defines the left side of the surface (FIG. 22b) is given by:

$$y=0.3 x^2-1.2 x, x=-2.9 \ldots 0 \text{ mm},$$

Figure 23:
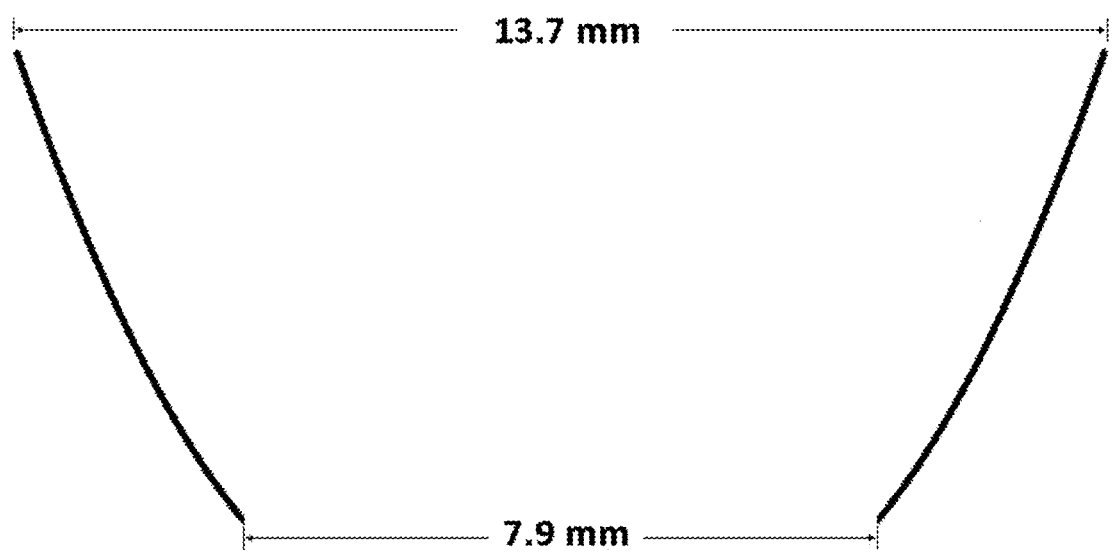
FIG. 23 illustrates side polynomial boundaries of an efficiency enhancing optical element.

The surfaces of the polynomial mold follow the same shapes and the two sides are separated by 7.9 mm as shown in FIG. 23.

Figure 24A:
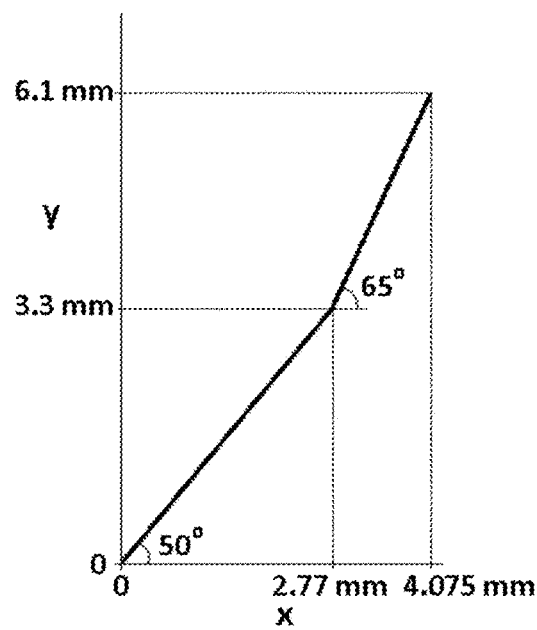
FIGS. 24a and 24b illustrate piecewise linear side surfaces of an efficiency enhancing optical element.
Figure 24B:
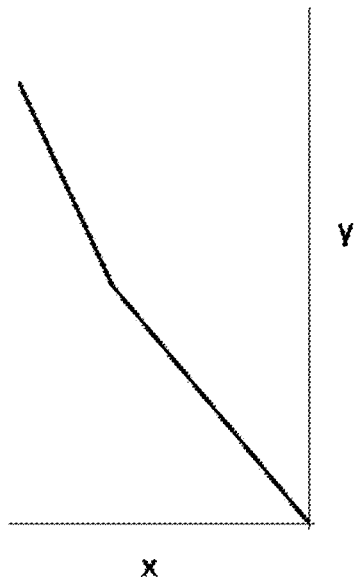
Figure 25:
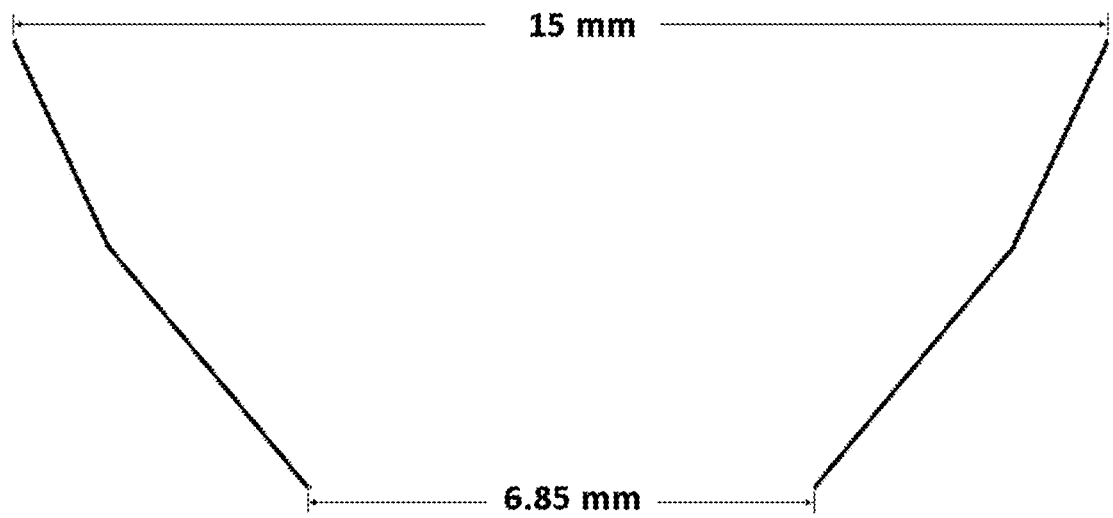
FIG. 25 illustrates side piecewise linear side boundaries of an efficiency enhancing optical element.

FIGS. 24a and 24b show piecewise linear functions y vs. x that define the shape of other specific side surfaces of the EEOE. In this case the function has two segments, one is making an angle of 50° with the x axis, extending from x=0 to x=2.77 mm and the second is making an angle of 65° with the x axis, extending from x=2.77 mm to x=4.705 mm. The two segments define the right side of the surface (FIG. 24a). The left side of the surface in this case is symmetrical as shown in FIG. 24b The surfaces of the piecewise mold are of the same shape and are separated by 6.85 mm as shown in FIG. 25.

The parameters of the polynomial and piecewise linear functions that determine the shape of the side surface of the transparent body of the EEOE as well as the distances between the two sides described above are given here for a specific selection of the EEOE material and LEDs characteristics. When the index of refraction of the EEOE material or the wavelengths or dimensions of the LEDs are changed, these parameters will change accordingly, namely, the polynomial may have different degree and coefficients, the piecewise linear function may have more segments with different angles between them, and the distance between the two sides may change.

Since the lighting module will mainly be used in grow lamps, it is important to have means for monitoring the plants. Adding a camera as part of a fixture that carries one or more lighting modules allows remote monitoring of the plant health state and growth stage. Information that is collected from the camera will be used as input data to image processing software that makes use of learning algorithms such as Convolution Neural Network, Recurrent Neural Network, and Reinforcement Learning, to allow better adaptation of the light characteristics to the specific plant.

As mentioned before, the spectrum of the lighting module can be controlled by grouping together same color LEDs creating different groups each with a specific color, and by controlling the current supplied to each group. In addition, there is also phosphor that provides white light. This makes it possible to illuminate the plant with different colors (blue, red, far-red, and white) by turning on one group or combinations of groups at a time. By taking photos of the plants under different illumination conditions we get different views of the same plant. The resulted images are fed into the image processing software.

The invention claimed is:

1. A lighting module for illuminating cultivated crops in indoor farming comprising at least one efficiency enhancing optical element (EEOE) further comprising:
   a. an optically transparent middle body portion having at least one light source embedded therewithin and configured to emit spectrally controllable radiation;
   b. a front portion comprising a spectrum conversion layer; said spectrum conversion layer absorbing at least part of said spectrally controllable radiation and emitting a spectrally converted radiation;
   c. a back portion configured to reflect said spectrally converted radiation emitted by said spectrum conversion layer to said cultivated crops,
      the back portion has a central area being adjacent to said optically transparent middle body portion configured for reflecting radiation propagating within said optically transparent middle body portion and a peripheral area configured for reflecting radiation emerged from said optically transparent middle body portion via a transparent side surface of said optically transparent middle body portion; said side surface is configured for:
   d. reflecting said radiation emitted by said at least one light source toward said front portion by total internal reflection (TIR);
   e. refracting at least a part of said spectrally converted radiation emitted backward by said spectrum conversion layer and redirecting said at least part of spectrally converted radiation outside said optically transparent middle body portion toward said peripheral area of said back portion; and
   f. reflecting at least a part of said spectrally converted radiation emitted backward by said spectrum conversion layer and redirecting said at least part of spectrally converted radiation into said optically transparent middle body portion toward said central area of said back portion;
      wherein said at least one light source comprises at least two groups of LEDs mounted on a PCB attached to a base plate;
      wherein said lighting module further comprises a color imaging camera for capturing multi-color and single-color images of crops; each of said single-color images is captured in illumination provided by turning on only one group of said at least two groups of LEDs; said images are analyzed to provide information about a plant stress state.

2. The lighting module according to claim 1, wherein at least one of the following is true:
   a. said EEOE is made of a polymeric material;
   b. said spectrum conversion layer is a composite material containing a photoluminescent material;
   c. said back portion comprises a layer of composite material containing reflective particles;
   d. said side surface of said optically transparent middle body portion of said EEOE is at least partially provided with a layer of a spectrum conversion material being in an optical contact thereto.

3. The lighting module according to claim 2, wherein said polymeric material is silicone.

4. The lighting module according to claim 2, wherein said photoluminescent material is phosphor.

5. The lighting module according to claim 2, wherein said reflective particles comprise titanium dioxide.

6. The lighting module according to claim 2, wherein said composite material comprises silicone.

7. The lighting module according to claim 2, wherein said layer of spectrum conversion material is releasably connectable to said middle body portion of said EEOE.

8. The lighting module according to claim 2 comprising a set of layers of spectrum conversion materials interchangeably connectable to said middle body portion of said EEOE; said set comprises a number of layers of spectrum conversion materials emitting radiation effective in growing predetermined cultivated crops.

9. The lighting module according to claim 1, wherein at least one of the following is true:
   a. a front surface of said EEOE is provided at least partially with a relief optical element that manipulates light either by refraction or by diffraction; said relief optical element is configured for a function selected from the group consisting of concentrating radiation exiting said EEOE within an area to be illuminated, or angularly redistributing said radiation within said area to be illuminated;
   b. a front surface of said middle body portion of said EEOE is provided with at least one element of the following: a layer of spectrum conversion material and a layer of a transparent material having a relief on its front surface which are in an optical contact to said front surface;
   c. said back portion is curvilinear and configured for concentrating reflected radiation within said area to be illuminated;
   d. said lighting module comprises a cover window configured for protecting said layer of a spectrum conversion material from environmental factors;
   e. said base plate is provided with a reflector selected from the group consisting a specular reflective coating, a diffuse reflective coating, a specular reflective sheet affixed to said base plate, a diffuse reflective sheet affixed to said base plate and any combination thereof;
   f. each group of said at least two groups of LEDs comprises LEDs configured for emitting radiation within different spectrum ranges; light intensity of radiation emitted by each group is independently controlled in order to provide radiation of variable spectral distributions.

10. The lighting module according to claim 9, wherein said layer of spectrum conversion material comprises at least one sheet that securable to said front surface of said middle body portion.

11. The lighting module according to claim 9, wherein said cover window is provided with a relief optical element on at least one surface thereof; said relief optical element is configured for a function selected form the group consisting of concentrating radiation exiting said EEOE within said area to be illuminated, angularly redistributing said radiation, splitting said radiation and any combination thereof.

12. The lighting module according to claim 11, wherein said cover window is releasably mountable.

13. The lighting module according to claim 11, wherein said cover window is securable over said lighting module by means of a coupling pawl.

14. The lighting module according to claim 11, wherein said cover window is slidably securable over said lighting module.

15. The lighting module according to claim 1, wherein said base plate characterized by thermal conductivity providing dissipation of heat generated by said at least one light source.

16. The lighting module according to claim 15, wherein said base plate is provided with a heat sink.

17. The lighting module according to claim 1, wherein said optically transparent side surface of said optically transparent middle body portion is defined by a polynomial function.

18. The lighting module according to claim 1, wherein said optically transparent side surface of said optically transparent middle body portion is defined by a piecewise linear function.

* * * * *